United States Patent [19]
Glaser

[11] 3,781,647
[45] Dec. 25, 1973

[54] METHOD AND APPARATUS FOR CONVERTING SOLAR RADIATION TO ELECTRICAL POWER

[75] Inventor: Peter E. Glaser, Lexington, Mass.

[73] Assignee: Arthur D. Little, Inc., Cambridge, Mass.

[22] Filed: July 26, 1971

[21] Appl. No.: 165,893

Related U.S. Application Data
[63] Continuation-in-part of Ser. No. 838,896, July 3, 1969, abandoned.

[52] U.S. Cl. .............................. 322/2, 310/4, 321/8
[51] Int. Cl. .................................................... H02n
[58] Field of Search ................. 310/4; 307/43, 149, 307/153; 322/2, 99; 250/212; 325/4, 26, 37, 115, 185; 321/8 R

[56] References Cited
UNITED STATES PATENTS
| | | | |
|---|---|---|---|
| 3,434,678 | 3/1969 | Brown et al. | 321/8 R UX |
| 3,535,543 | 10/1970 | Dailey | 321/8 R X |
| 3,459,391 | 8/1969 | Haynos | 310/4 X |
| 3,432,690 | 3/1969 | Blume | 321/8 X |
| 3,462,636 | 8/1969 | Seunik et al. | 321/8 X |
| 3,225,208 | 12/1965 | Wolfe | 307/43 |
| 3,522,433 | 8/1970 | Houghten | 325/4 UX |

*Primary Examiner*—D. F. Duggan
*Attorney*—Bessie A. Lepper

[57] ABSTRACT

Solar radiation is collected and converted to microwave energy by means maintained in outer space on a satellite system. The microwave energy is then transmitted to earth and converted to electrical power for distribution.

19 Claims, 6 Drawing Figures

INVENTOR.
Peter E. Glaser

METHOD AND APPARATUS FOR CONVERTING SOLAR RADIATION TO ELECTRICAL POWER

This application is a continuation-in-part of my co-pending application Ser. No. 838,896 filed July 3, 1969, now abandoned.

This invention relates to a method and apparatus for utilizing the radiation energy of the sun to an extent that solar energy can serve as a measurable part of the electrical power requirements of the earth.

The primary source of energy is now fossil fuels, i.e., coal, oil and natural gas. In recent years nuclear energy generated power has received considerable attention and is now being used to supplement the power derived from the fossil fuels. Although no one knows the extent of fossil fuel reserves, it appears that their availability may begin to drop off while the demand for energy and power continues to rise. There are at present serious doubts that nuclear energy can be relied upon to fill a continuously larger percentage of energy requirements, since there are no known ways as yet to provide complete insurance against environmental pollution by nuclear energy plants.

Increases in the level of energy consumption in the United States can be directly related to increases in GNP. Consumption of energy has increased from about 3 percent a year between 1947 and 1965 to about 5 percent a year since 1965. The United States is presently burning annually 500 million tons of coal, 20 trillion cubic feet of gas and 5 billion barrels of oil. It is estimated that in order to meet an ever-increasing power demand, the United States will have to increase its power-generating capacity to six times its present level by the year 2,000. This means an increase from 330 million kilowatts to nearly 2 billion. Therefore, in addition to raw material supply considerations, these tremendous requirements for energy raise equally tremendous problems in ecology.

All available energy sources now in use (coal, oil, gas and nuclear fuel) have a major drawback — they produce by-products that pollute the air, water and land. The resulting problems of pollution control and waste disposal are fast becoming staggering both in magnitude and cost.

In contrast, use of radiation energy from the sun in an effective and efficient manner offers the possibility of providing electrical power without the problem of pollution control and waste disposal.

Power from the sun is not a new concept. However, up to a few years ago it has been treated as a more-or-less scientific curiosity or as an energy source which is of more academic rather than practial interest. More recently, however, the space program has undertaken to use solar energy for power aboard spacecraft and the use of solar energy to generate a sizable quantity of electrical power appears feasible. The potential of solar energy was recognized in the President's energy message to Congress of June 4, 1971, in which he noted that "the sun offers an almost unlimited supply of energy if we can learn to use it economically. The National Aeronautics and Space Administration and the National Science Foundation are currently re-examining their efforts in this area, and we expect to give greater attention to solar energy in the future."

The practicality of generating electrical power on earth from solar energy has previously been questionable because of the absorption of solar energy by the atmosphere, obscuration by clouds, dust deposition, wind effects on structure, the limited availability of the sun's radiation at low sun angles and the lack of energy at night. Even in areas where solar energy is received throughout most of the year, a sudden interruption by a cloud could require spinning standby power generators of equivalent capacity or an energy-storage system which would be orders of magnitude more effective than batteries.

Another factor to be considered in the direct collection of solar radiation on earth is the solar collector surface area that would be required to supply the projected electrical power demand. Assuming for the sake of argument that the conversion efficiency of solar radiation collected on earth is 100 percent, the estimated total solar collector area required by the year 2,000 for the United States would be about 284 square miles.

It is therefore a primary object of this invention to provide an integrated system capable of providing electrical power on earth in large amounts from solar energy. It is another object of this invention to provide a system of the character described which is arranged for a continual delivery of electrical power free from such factors as cloud cover, eclipses of the sun by the earth, and the like. It is yet another primary object of this invention to provide electrical energy in large amounts by a system and method which do not deplete the earth's natural resources and which are essentially pollution free. Other objects of the invention will in part be obvious and will in part be apparent hereinafter.

By the method and apparatus of this invention, the radiation energy derived from the sun is converted to microwave energy in equipment maintained in outer space, then it is transmitted as microwave energy to suitable collectors on earth. Hence, the problems of absorption of the solar radiation by the atmosphere and of sudden interruptions are eliminated because microwaves can pass through the atmosphere with minimum absorption and scattering. By receiving the solar energy and converting it into the form of microwave energy, the microwave energy can be collected in widely dispersed locations on earth without regard to availability of solar radiation, e.g., in northern latitudes, locations of large-scale power consumption centers, etc. Hence the major drawbacks associated with the direct terrestrial collection of solar energy are minimized.

The invention accordingly comprises the several steps and the relation of one or more such steps with respect to each of the others and the apparatus embodying the features of construction, combination of elements and arrangement of parts which are adapted to effect such steps all as exemplified in the following detailed disclosure and the scope of the invention will be indicated in the claims.

For a fuller understanding of the nature and objects of the invention reference should be had to the following detailed description taken in connection with the accompanying drawings in which FIG. 1 is a perspective view showing two satellites in position orbiting the earth and equipped with radiation energy collecting means;

Figure 5:
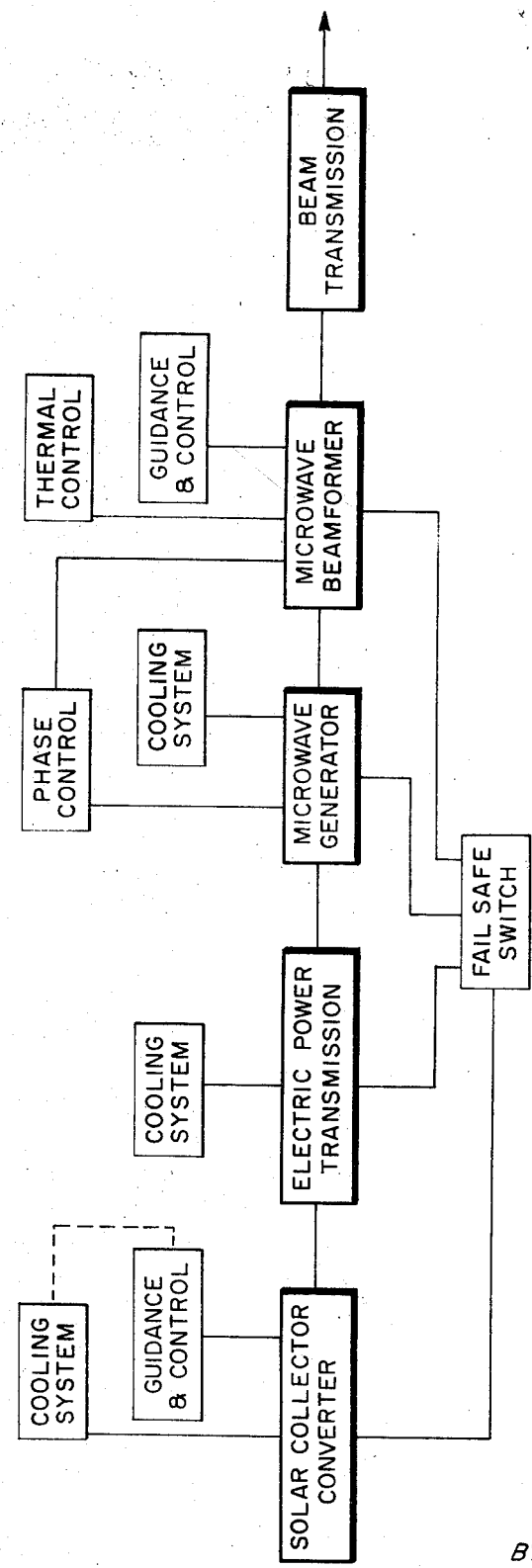
Figure 6:
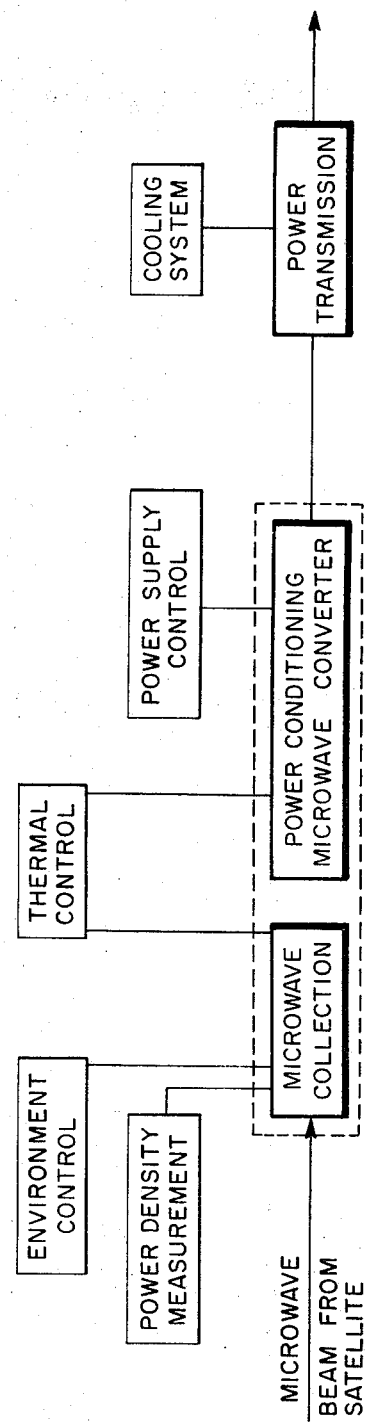

FIG. 5 is a diagram detailing the apparatus components which are located on the satellite and which are concerned with the conversion of the solar energy to microwave energy and the transmission of such energy by a microwave beam to earth; and FIG. 6 is a diagram detailing the apparatus components which are located on the earth and which are concerned with the conversion of microwave energy to electrical power.

In brief the apparatus of this invention comprises a system including one or more geostationary satellites positioned in energy receiving relationship to the sun and having means to collect and convert solar energy to electrical energy and electrical energy to microwave energy along with means to transmit the microwave energy to microwave energy receivers on earth. Means are provided to convert the microwave energy to electrical power. Auxiliary equipment such as guidance and attitude control devices as well as cryogenic apparatus for providing refrigeration for superconducting transmission lines and for cooling at least some of the equipment are also provided.

Figure 1:
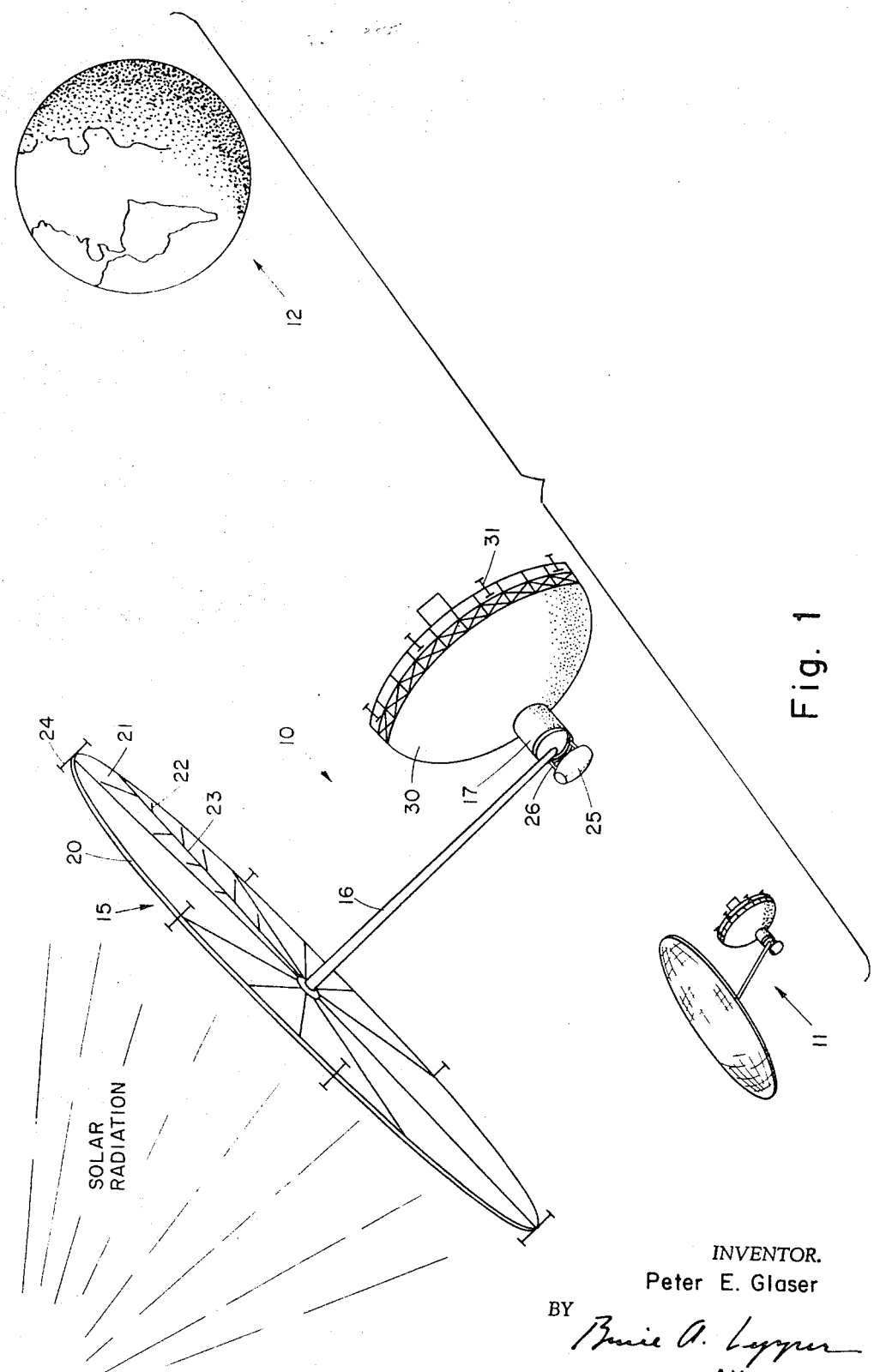

The satellite system of this invention, in which the collection and conversion of the solar radiation to microwave energy is carried out in outer space, is shown in a somewhat perspective view in FIG. 1. Two geostationary satellites 10 and 11 are shown positioned with respect to the earth 12 so that at least one is illuminated by the sun at all times. As an example, at an altitude of 22,300 miles in an orbit parallel to the earth's equatorial plane, a satellite moving east to west would be stationary with respect to any point on earth. However, at times the satellite would pass through the earth's shadow. Thus having two satellites in the same orbit but out of phase permits one to be illuminated while the other is in shadow. For example, at an altitude of 22,300 miles, the two satellites could be placed about 21° out of phase or about 7,900 miles apart. Such a phase difference would keep the satellites above the horizon and both would have a direct line of sight to the same point on earth. A network of satellite stations, such as those shown in FIG. 1, could be employed to position stations in orbit to achieve the most effective system operation and to supply widely dispersed points on earth either continuously or as required to meet peak power demands.

If, on the other hand, it is not necessary to provide a continuous supply of electric power, then a single satellite may be used, taking power from it at will or whenever it was positioned in solar energy receiving relationship with the sun.

As an example of the general type of satellite structure which may be used to make up one of the satellites in a system, the satellite 10 of FIG. 1 may be considered. Satellite 10 has a solar collector/converter 15 pivotally mounted on a support member 16 which is pivotally attached to an equipment housing 17 of the satellite. The embodiment of the solar collector/converter 15 shown in FIG. 1 comprises a large-surface area platform such as a disc or dish-shaped member 20 which is divided into sectors such as sector 21. Associated with each sector are current collecting and transmitting means such as branch wires 22 and main lead wire 23. The main lead wire 23 from the sectors are then connected to a main cable (not shown) which extends down through support 16 to microwave energy generating equipment located in equipment housing 17.

Means, such as small attitude control rockets 24, are provided to position the solar collector/converter 15 in a continuously optimum orientation. It is, of course, within the scope of this invention to form the solar energy collector/converter in any configuration, the circular one shown representing but one illustrative embodiment.

If the satellite is a manned space station then personnel quarters 25 are provided with proper communication means being included such as passage 26 connecting quarters 25 with equipment housing 17 and means for docking earth-to-satellite supply spacecraft. An antenna 30 with appropriate guidance and attitude control means 31 is affixed to the equipment housing 30. The positioning and guiding of the antenna must be very accurate in order to direct the beam of microwave energy to the receiving stations on earth 12.

Figure 2:
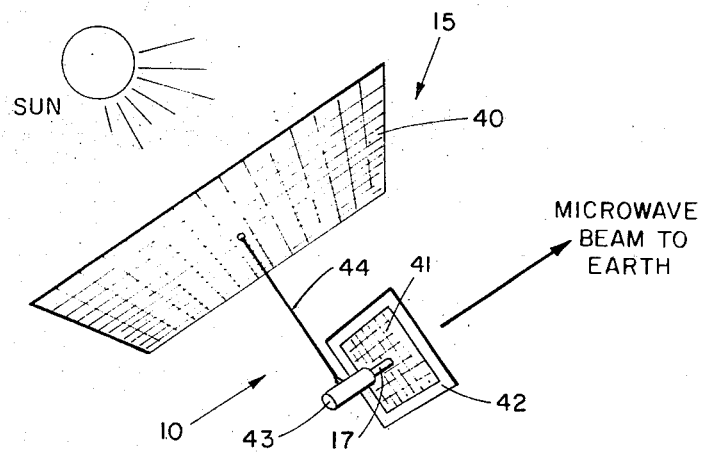
FIG. 2 is a perspective view of another satellite embodiment.

In the satellite embodiment of FIG. 2, in which like reference numbers are used to refer to like components of FIG. 1, the solar collector/converter 15 is in the form of an array of solar cells 40 and the antenna is shown as a planar phased array 41 having a waste heat radiator 42. Suitable cooling equipment is housed in 43 and is available for supplying refrigeration to both the articulated cable 44 and the inner panels of the antenna array 41.

Figure 3:
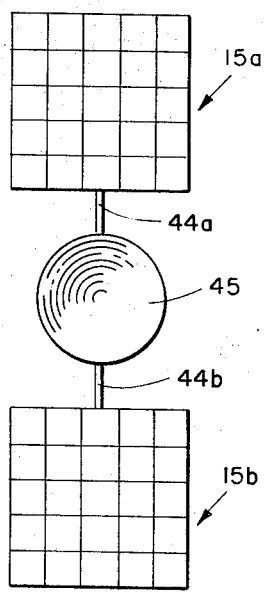
FIGS. 3 and 4 are top planar and said elevational views of a third satellite embodiment constructed in accordance with this invention.
Figure 4:
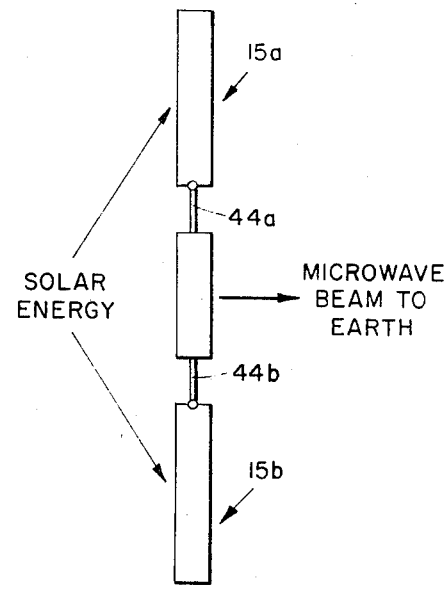

FIGS. 3 and 4 shown another general satellite arrangement (without auxiliary equipment) in which two arrays of solar cells 15a and 15b are joined through articulated cables 44a and 44b to an antenna 45 which may be of any design and configuration as detailed below.

Having described several general set-ups for the satellite or satellites, it is possible to turn to the specific apparatus which may be used to effect the conversion of solar energy into d.c. electrical energy and then into microwave energy and the mechanism for transmitting one or more beams of microwave energy to electrical energy is described.

FIG. 5 is a diagram which details the apparatus components which are located on each satellite used and the interrelationships and control of these components.

The solar energy collecting/converting means, such as the disc 20, must be capable of converting radiant energy received from the sun to electrical energy. The solar energy collecting/converting means may be made up of photovoltaic, thermoelectric or thermionic devices. Thus if photovoltaic means are to be used, a plurality of solar photovoltaic conversion devices are affixed to the surface of disc 20 directed toward the sun. A number of such photovoltaic conversion devices are known and they include, but are not limited to cadmium sulfide cells, N/P silicon cells, webbed dendrite silicon or silicon ribbon single crystals in appropriate form, silicon solar cells or layers of monolithic, integrally connected film cells, gallium arsenide solar cells, and organic film solar cells.

Preferably the photovoltaic collection means should be in the form of large thin areas, should be of low cost and exhibit good stability and high efficiency. Thus, although single PN-junction single transition silicon solar cells having theoretical efficiencies of 20 to 25 percent may be used, it would be preferable to construct a multicellular device consisting of two or more photovoltaic layers in a sandwich configuration which may have an efficiency up to about 40 percent. It is also possible to form the photovoltaic conversion cells of organic compounds which are known to have semiconductor characteristics. Photovoltaic devices for collecting solar energy and converting it to electrical energy are extensively described in the literature and large solar arrays are known (See for example A. Smith, "Status of Photovoltaic Power Technology," ASME Winter Annual Meeting, New York, Dec. 1, 1968; Paper No. 68-WA/Sol-1; J. E. Boretz, "Large Solar Arrays — The Emerging Space Power Workhorse, 6th Space Conference Proceedings, Vol. II, Cocoa Beach, Florida, March, 1969; and "First Technical Report: Evaluation of Space Station Solar Array Technology and Recommended Advanced Development Programs," Lockheed Missiles and Space Company, Sunnyvale, California, December, 1970, Contract NAS9-11039.)

In a similar manner, thermoelectric converters such as bimetallic junctions which undergo the Seebeck effect to convert heat into electrical energy and thermionic devices such as high vacuum and plasma diodes may be used in the collector/converter 15 in place of or in conjunction with photovoltaic converters.

It may be advisable to protect the cells with conductive ultraviolet absorbing layers to protect the photoconductive film and to convert the ultraviolet radiation to usable near-ultraviolet or visible light. It may also be desirable to incorporate optical concentrators in the solar collector/converter to focus the solar radiation on the cells. Such optical concentrators are described by Beckman, Schoffer, Hartman and Lof in *J. Solar Energy*, Vol. 10, No. 3, 1966, pages 132–136.

Inasmuch as the solar collector/converter must be continually oriented to face the sun, means must be provided to guide the collector/converter and to control its orientation. Guidance means include, but are not limited to, sun sensors, star trackers and horizon seekers, all known components. Control and actual orientation of the solar collector/converter may be effected by gas fired rockets or ion reaction engines run on a gas such as nitrogen applied from a cryogenic liquid supply. A closed cryogenic system such as described in U.S. Pats. Nos. 2,906,101 and 2,966,035, may be used to supply the liquid nitrogen, which after expansion may be circulated through the solar collector/converter as a cooling medium prior to recompression and liquefaction.

Each of the photovoltaic cells is then connected by suitable wiring to a collector/converter cable which is connected to a main cable which extends down through the rigid support rod 16 to a microwave generator located in the equipment housing section 17 of the satellite. The division of the solar collector into sectors and the interconnection of the sectors in order to provide large amounts of power to efficient generators for producing large amounts of microwave energy is generally to be preferred.

The transmission of such a large amount of d.c. electric power on the satellite indicates the desirability of using superconducting cables to reduce weight and power losses, and therefor indicates the need for incorporating into the power station some form of a cryogenic refrigerator to furnish the necessary refrigeration to the components to keep them in a superconducting state. Thus the cooling system shown to be associated with the electric power transmission (cables, etc.) is conveniently one or more cryogenic refrigerators of a type designed to operate for extended periods of time without any maintenance. Superconducting transmission lines are well known as well as the cryogenic refrigerators necessary to provide the very low-temperature refrigeration necessary to maintain them in their superconducting state. Exemplary of such refrigerators are those described in U.S. Pats. No. 2,906,101 and 2,966,035. As an example of the high power levels which must be handled and the manner in which this may be accomplished, it may be shown that to transmit $10^7$ Kw (20 Kv at $5 \times 10^5$ Amp) two conductors of 2-inch diameter cooled to about 15° K using liquid helium and suitably insulated are required. Thermal insulations are highly developed and multi-stage cryogenic refrigerators delivering 1,000 watts of refrigeration are adequate to cool the lines to superconducting temperatures and to absorb heat leaks.

The transmission line itself must be articulated to provide relative movement between the solar collector/converter and the microwave energy generator. This requirement arises because the solar collector/converter must be continually oriented to face the sun while the microwave energy generator and associated microwave beam formers must remain accurately pointed at the microwave energy collector/converter on the earth. Articulated connections are known in the form of rotary joints and slip ring assemblies.

The purpose of the microwave energy generator is, of course, to convert the d.c. electric power developed in the solar collector/converter to electrical energy at microwave frequencies so that it may be formed into a suitably shaped electromagnetic beam for transmission to earth. The wavelength of the microwave electromagnetic radiation formed for transmission to earth should preferably be between about 3 and 30 cm.

The microwave energy generator is preferably one which operates at high power levels on continuous-wave oscillations at a single frequency. Many such generators are known including, but not limited to, klystrons, traveling-wave tubes, backward-wave oscillators and amplifiers, twystrons, and crossed-field devices which include resonant types such as magnetrons, nonresonant backward and forward wave types such as amplitrons, carcinatrons and dematrons. The crossfield devices provide the highest efficiency of any dc-to-microwave frequency converter, and the amplitrons are capable of handling large amounts of power. Kylstrons, magnetrons and traveling-wave devices have long been known and are well developed. (See for example the chapter on "Transmitters" by Thomas Weil in "Radar Handbook," M. I. Skolnik, editor-in-chief, McGraw-Hill Book Co., N.Y., 1970.) The magnetron oscillator which is a self-excited oscillator, and the amplitron which is a broadband amplifier, utilize similar means to convert dc into microwave energy. The amplitron is, in particular, an excellent amplifier over a relatively broad band of frequencies, possessing an inherently higher circuit efficiency than the magnetron oscillator. (See for example Twisleton, *Proc. IEE*, Vol. III, No. 1, January, 1964, pages 51–56; "Ultra High Power Amplitron," Vol. I, CW Amplitron Development Technical Report No. RADC-TDR-64-389, May, 1965; Skowron, MacMaster and Brown, "The Super Power CW Amplitron," *Microwave Journal*, Vol. 7, October, 1964; Ruden, "Large Signal Analysis," Twenty-Second Quarterly and Final Report, Contract No. NObsr-77590, Sept. 7, 1964, Raytheon Report No. SPO-012, Section 2.3, pages 41–60; and Brown, "Crossed-Filed Microwave Tubes," *Electronics*, April 29, 1960.)

To accommodate the power desired, a number of microwave generators will be needed, and they must operate in phase synchronization with each other. This may be accomplished by the use of an appropriately chosen, controlled phase shifting network employing known phase shifters such as those incorporating ferrites, switched diodes, variable-length line design techniques, and the like. (See for example Chapter 12, "Phase Shifters for Arrays" in "Radar Handbook," M. I. Skolnik, editor-in-chief, McGraw-Hill Book Co., N.Y., 1970.) A properly programmed computer may be used in conjunction with the phase shifting mechanism.

Since heat is generated at both the anode and cathode of a dc-to-microwave converter, the microwave generators must be cooled. One method for removing heat is based upon the use of a heat transfer fluid circulating in a closed system. Subsequent to the cooling of the microwave generators through indirect heat exchange, the fluid is directed through heat pipes through which the heat picked up is radiated into space. Another method involves the use of space radiators distributed over wide areas of the satellite. If a multiplicity of smaller microwave generators is used, each of these devices may have a radiator attached to it to reject excess heat to space. If the heat thus removed is at a sufficiently high temperature, it may be possible to use it (prior to radiating it into space) to run auxiliary power systems for space processing and manufacturing purposes. (See for example Baretz "Large Space Station Power Systems: *J. Spacecraft & Rockets*," Vol. 6, No. 8, August, 1969, pages 929–936; and von Braun "Opening Remark-Space Processing and Manufacturing." Proc. of Conference at NASA, MSFC, October 21, 1969, NASA Report ME-69-1.) Heat pipes having projected weights of one-tenth pound per kilowatt appear feasible (See Turner and Harbaugh "Design of a 50,000-Watt Heat-Pipe Space Radiator" ASME Aviation and Space Program and Prospects, Annual Aviation and Space Conference, June 16–19, 1969, pages 639–643.) Known coatings and thermal insulations to attenuate and control the flow of heat may be used to supplement and enhance the cooling system used.

The antenna network, designated by the numeral 30 in FIG. 1 or 40 in FIG. 2 forms a part of the microwave beamforming and transmission means which will, in accordance with known practice, include the necessary auxiliary equipment such as oscillators, amplifiers, phase shifters, etc. The microwave antenna network must be capable of accurately directing the microwave beam of electromagnetic energy to the receiving station on earth. The radiation power pattern of the microwave beam must be formed into a desirable configuration with respect to the main beam shape and width and to sidelobe energy distributions locked onto the earth-based receiving antenna. These beam requirements are met by generating the proper amplitude and phase source distributions over the antenna aperture, and by the use of additional mechanical or electronic beam stirring and alignment mechanisms where necessary.

Formation of the beam is accomplished through a large antenna which is preferably an aperture radiating system. Although it is possible to use a reflecting or disk type antenna (with a single radiating source or an array of independent sources placed at a focus and with the use of a subreflector if desired), a planar phased array of individual radiators has distinct advantages for the microwave beam forming and transmission means of this invention. Among such advantages are a simpler cooling system, and direct compatability, from a power capability stand-point, with the use of klystrons and amplitrons as the means for dc-to-microwave energy conversion and amplification.

A beam radiation power pattern that optimizes the system energy transmission and collection process and efficiency is desired. There are several well-established criteria for such optimizations. (See for example Chapter 9, in "Radar Handbook," M. I. Skolnik, editor-in-chief, McGraw-Hill Book Co., N.Y., 1970.)

Many different types of microwave antennas are described in the literature. See for example R. C. Hansen "Microwave Scanning Antennas" Vol. I, Academic Press, Inc., N.Y., 1964; M. I. Skolnik "Introduction to Radar Systems" McGraw-Hill Book Co., Inc., N.Y. 1962, pages 347–349. Chapters 10 and 11 of "Radar Handbook," M. I. Skolnik, editor-in-chief McGraw-Hill Book Co., N.Y., 1970; and R.E. Collin and F. Zucker "Antenna Theory, Parts 1 and 2," McGraw-Hill Book Co., N.Y. 1969.

Since it is necessary to provide each array radiator with its individual source of power, it may be preferable to provide an individual dc-to-microwave converter, e.g., a klystron-amplitron, for each radiator, e.g., a half-wave dipole. In such an arrangement, the cooling system for the microwave generator means and for at least the outer panels of the phase array antenna may be reduced to heat transfer surfaces adapted to radiate heat directly into space. The high power densities in the center of the array may, if desired, be attained by a different type or capacity generator and use of a cooling liquid for thermal control.

The guidance and control means associated with the microwave beamforming means must be adapted to achieve alignment of the sections making up the planar array, to aim the total array (or in effect the center of the transmitted microwave energy beam) toward the center of the earthbased collector, and to effect the necessary phasing of the amplitrons or other microwave generators. In the alignment of the panels of the array it is first necessary to establish a reference plane. This may be defined by the axis of a rotating laser. The laser beam propagating along the array axis may be deflected radially by a rotating mirror which, along with the laser, is mounted on the center panels. By interconnecting the panels with flexible connections, the panels may be aligned relative to each other and to the total array to obtain the desired alignment. Control of the individual panel movements may be effected through photodetector probes acting in conjunction with the rotating laser beam. The aiming of the microwave energy beam to the earth based collector may be achieved in several ways. Aiming may be accomplished from the ground by probing the power density profile at the collector at several points, any correction signals being transmitted to the guidance mechanism associated with the microwave beamforming means. Aiming of the microwave energy beam may also be accomplished from the orbiting phased array by sensing the phase front received across the array from a ground-based reference transmitter, and adjusting the phases of the individual array transmitters accordingly to focus the array microwave beam onto the center of the earthbased collector. Guidance of the antenna may be by such known devices as ion engines, gas-fired engines, and the like.

The necessity for the phasing of the microwave generator has been noted above. If amplitrons are used as microwave sources and a phased array antenna is employed, phasing of the amplitrons and of the planar array may be accomplished with a phase-lock system which locks the phase of the field of the respective array panel to a reference signal. The reference signal may, in turn, be transmitted to the panel by a laser beam which may, if desired, be in the form of a pulse train which is phase-locked to a subharmonic of the transmitted microwave frequency and used to modulate the laser output.

As will be seen in FIG. 5 a fail safe switch is provided which may be connected to one or more of the main components located on the satellite, i.e., the solar collector/converter, the transmission line, the microwave generator or the microwave antenna/beamformer. The fail safe switch may be triggered by the continued overheating of any one of these components or by the failure of the guidance and control systems associated with the solar collector/converter or the microwave antenna/beamformer. Exemplary of a fail safe switch is a mechanism adapted to convert the well-defined, narrow microwave beam to a significantly lower power density omnidirectional-like radiation pattern by switching to random phase operation of the array generators. Another type of fail safe switch is a self-destruct mechanism design to disengage that portion of the apparatus which is malfunctioning.

The total power transmitted by the microwave beam transmitted to earth will be in thousands of megawatts, a fact which will require the isolation of a sufficiently large corridor of space extending from the satellite or satellites to the collection area on earth. Such high power levels are very different from the few kilowatts handled by communications systems and therefore require the exercise of some type of environmental control, preferably in the form of a clear definition of the extent of such corridors so that all aircraft are prevented from entering them. This would, of course, be a matter for control by the proper governmental agency. However, this corridor exclusion would not be necessary if the power density in the microwave beam were kept below established government safety standards by increasing the size of the transmission array and ground collectors to accomodate the same total power with the lower power density, but perhaps with increased costs.

Turning to the diagram of FIG. 6, the components located at a fixed place on the earth's surface are given. The microwave energy collector is located at a desired point on earth and there may, of course, be a number of these served by their respective satellite systems. The microwave receiver antenna must be of a relatively efficient type. These are known and include, but are not limited to incoherent and phased arrays of individual antennas and focused systems with single or multiple feeds and parabolic reflectors. Once the microwave energy is collected, one of the several known devices capable of converting microwave energy into dc power at acceptable efficiencies may be used. Thus, for example, semiconductor diodes or thermionic diodes may be used for this purpose. Thus the microwave collection means and the microwave converter means may be two separate types of devices.

However, as indicated by the dotted lines in FIG. 6, these two steps of microwave collection and conversion may be combined in one device, namely a phased array consisting of a large number of individual antennas such as dipoles, slots, horns, or open-ended wave guides, each one of which is terminated in a rectifier. Such a phased array may be constructed of a large number of "rectennas" which are relatively non-directive in nature and therefore do not need to be pointed directly at the transmitting antenna on the satellite. A highly efficient microwave rectifier exists in the form of the solid-state Schottky-barrier diode and is suitable for use in the earthbound microwave collector/converter means. (See for example W.C. Brown, "Progress in the Design of Rectennas," *Journal of Microwave Power*, Vol. 4, No. 3, 1969 pages 168–175; R. H. George, "Solid-State Rectifiers," in Microwave Power Engineering, Vol. 1, ed. E. C. Okress, Academic Press, pages 275–294; and P. H. Smith, "Solid-State Microwave Rectification" Technical Report RADC-TR-67-334 (July, 1967).)

The thermal control means associated with the earth-based microwave energy collection and converter means may, in the case of a phased array of rectennas comprise extended heat transfer surfaces from which the heat is radiated to the atmosphere. These thermal control means may also be in the form of heat pipes or in the form of a system to circulate a cooling fluid for indirect heat exchange. The cooling fluid may be recirculated, if desired, and if it reaches a sufficiently high temperature it may be used as an auxiliary energy source.

Associated with the microwave energy collection and converter means are power density measurement means and power supply control means. Both of these components are known and used in conventional power generation and need not be described further.

The electric power delivered from the converter will be distributed over suitable cables to various distribution points. Such cables may be superconducting in which case suitable cryogenic refrigeration means are provided to maintain the required superconducting temperatures. The cryogenic equipment for this purpose may be the same as that used aboard the satellite or it may be equipment capable of delivering large quantities of liquid helium such as that described in U.S. Pat. No. 3,438,220 3,415,077 and 2,458,894.

The actual size of the various apparatus components may be shown in the following example which is meant to be illustrative and not limiting in any sense. A system scaled to deliver 10,000 megawatts of electric power to earth in the form of microwave power wherein the wavelength is between 10 and 20 cms, requires a solar collector/converter covering 25 square miles. A microwave generator formed of 10,000 amplitrons, each with an output power of 1,000 Kw, would be connected to a phased-array planar antenna consisting of 100 rows of array panels with 100 panels in each row. Since the panels are preferably made in different sizes depending upon their position within the total array, the antenna would be 500 × 500 meters and the panel sizes would vary from 1.6 × 1.6 meters in the center to about 20 × 20 meters in the corners of the array. The superconducting cable between the solar collector/converter forming the electrical transmission line would be formed as two conductors of 2 inch diameter, each about 2 miles long. A cryogenic refrigerator system required to maintain these conductors at about 15° K must deliver some 1,000 watts of refrigeration.

The antenna described, located on a satellite in synchronous orbit 22,300 miles from earth will focus 99.9 percent of the generated microwave energy into a 36-square-mile receiving zone area on earth, this being the approximate size of the microwave collector/converter. The microwave collector/converter may be positioned on the ground or raised above the ground so that buildings housing facilities may be located below it. It may be desirable to cover the microwave collector with some material which is transparent to the wavelengths of the microwave energy being handled.

A system of space power satellites could provide a nearly inexhaustible source of available electric power. For example, a belt of solar cells three miles wide around the earth in synchronous orbit would intercept $1.68 \times 10^{15}$ watts of solar energy. Assuming the present attainable rate of 8 percent conversion of the power, a total of $1.34 \times 10^{14}$ watts could be made available in the form of d.c. power in widely distributed locations over the surface of the earth. Such a power level would provide $1.17 \times 10^{15}$ kilowatt hours of electrical energy per year, or over 200 times the projected world electrical energy requirements for the year 1980.

Thus by transmitting solar energy to earth in the form of microwave energy the effects of atmosphere, clouds and other physical influences may be essentially discounted. With a system which is designed to continuously receive solar energy the amount of standby equipment may be minimized. Finally, the use of solar energy in no way depletes the earth's resources and presents no problems of pollution or waste removal.

It will thus be seen that the objects set forth above, among those made apparent from the preceding description, are efficiently attained and, since certain changes may be made in carrying out the above method and in the construction set forth without departing from the scope of the invention, it is intended that all matter contained in the above description or shown in the accompanying drawings shall be interpreted as illustrative and not in a limiting sense.

I claim:

1. An apparatus for converting solar radiation energy to electrical power, comprising in combination
   a. a satellite system comprising at least one geostationary satellite positioned such that said satellite is in energy-receiving relationship to the sun;
   b. solar energy collector/converter means associated with each of said satellites adapted to collect and convert radiation received from the sun to d.c. electrical energy;
   c. solar energy collector/converter guidance and control means adapted to orient said solar energy collector/converter in a predetermined relationship with said sun;
   d. dc-to-microwave energy converter means adapted to convert said d.c. electrical energy from said solar energy collector/converter to microwave energy;
   e. articulated electric power transmission means connecting said solar energy collector/converter means with said dc-to-microwave energy converter means;
   f. microwave beamforming and energy transmission means adapted to form said microwave energy into a beam of a predetermined configuration suitable for transmission from said satellite system and to transmit said beam from said satellite system;
   g. microwave collection zone means on earth;
   h. microwave beamforming and energy transmission guidance and control means adapted to direct said microwave beam to said collection zone means on earth; and
   i. microwave collector/converter means located within said collection zone means and adapted to receive said microwave beam and to convert it to electric power.

2. An apparatus in accordance with claim 1 wherein said satellite system comprises a plurality of said satellites positioned with respect to each other such that at least one of said satellites is always in energy-receiving relationship with the sun.

3. An apparatus in accordance with claim 1 wherein said solar energy collection and conversion means comprises a large surface area platform member divided into sectors, each sector being formed of a plurality of cells capable of converting solar radiant energy to electrical energy.

4. An apparatus in accordance with claim 1 wherein said electric power transmission means comprises superconducting cable means and said apparatus includes cryogenic refrigerator means adapted to maintain said cable means in a superconducting state.

5. An apparatus in accordance with claim 1 including cooling means associated with said solar collector/converter means.

6. An apparatus in accordance with claim 1 including phase control means adapted to control the phase of said microwave beam.

7. An apparatus in accordance with claim 1 including means to control the temperature of said dc-to-microwave energy converter means.

8. An apparatus in accordance with claim 1 including means to control the temperature of said microwave beamforming and energy transmission means.

9. An apparatus in accordance with claim 1 including fail safe switch means connected to one or a combination of said solar energy collector/converter means, dc-to-microwave energy converter means, said electric power transmission means and said microwave beamforming and energy transmission means.

10. An apparatus in accordance with claim 1 including means to control the temperature of said microwave collector/converter means.

11. An apparatus in accordance with claim 1 including earthbased electric power transmission means connecting said microwave collector/converter means with predetermined distribution points.

12. An apparatus in accordance with claim 11 wherein said earthbased electric power transmission means are superconducting cable means and said apparatus includes cryogenic refrigerator means adapted to maintain said cable means in a superconducting state.

13. An apparatus for converting solar radiation energy to electrical power, comprising in combination
   a. a satellite system comprising at least one geostationary satellite positioned such that said satellite is in energy-receiving relationship to the sun;
   b. solar energy collector/converter means associated with each of said satellites adapted to collect and convert radiation received from the sun to d.c. electrical energy;

c. solar energy collector/converter guidance and control means adapted to orient said solar energy collector/converter in a predetermined relationship with said sun;

d. cooling means associated with said solar collector/converter means;

e. dc-to-microwave energy converter means adapted to convert said d.c. electrical energy from said solar energy collector/converter to microwave energy;

f. means to control the temperature of said dc-to-microwave energy converter means;

g. articulated electric power transmission means connecting said solar energy collector/converter means with said dc-to-microwave energy converter means and comprising superconducting cable means;

h. cryogenic refrigerator means adapted to maintain said cable means in a superconducting state;

i. microwave beamforming and energy transmission means adapted to form said microwave energy into a beam of a predetermined configuration suitable for transmission from said satellite system and to transmit said beam from said satellite system;

j. means to control the temperature of said microwave beamforming and energy transmission means;

k. phase control means adapted to control the phase of said microwave beam;

l. microwave beamforming and energy transmission guidance and control means adapted to direct said microwave beam to a predetermined collection zone on earth;

m. fail safe switch means connected to one or a combination of said solar energy collector/converter means, dc-to-microwave energy converter means, said electric power transmission means and said microwave beamforming and energy transmission means;

n. microwave collector/converter means located within said collection zone and adapted to receive said microwave beam and to convert it to electric power;

o. means to control the temperature of said microwave collector/converter means;

p. earthbased electric power transmission means connecting said microwave collector/converter means with predetermined distribution points and comprising superconducting cable means; and q. cryogenic refrigerator means adapted to maintain said earthbased electric power transmission means in a superconducting sate.

14. An apparatus in accordance with claim 13 wherein said satellite system comprises a plurality of said satellites positioned with respect to each other such that at least one of said satellites is always in energy-receiving relationship with the sun.

15. A method of converting solar radiation energy to electrical power on earth, comprising the steps of a. collecting and converting solar energy to dc power in outer space;

b. transmitting in outer space said dc power over electrical cables to a dc-to-microwave energy converter;

c. converting the transmitted dc power to microwave energy in outer space;

d. forming in outer space a beam of said microwave energy having a predetermined, optimized beam power pattern shape;

e. transmitting said beam of microwave energy to a predetermined collection zone on earth;

f. collecting said microwave energy; and g. converting the collected microwave energy into dc power on earth.

16. A method in accordance with claim 15 wherein said electrical cables are superconducting and said method includes the step of supplying cryogenic refrigeration to maintain said cables in the superconducting state.

17. A method in accordance with claim 15 wherein the steps of collecting said microwave energy and converting it into dc power are combined into a single step.

18. A method in accordance with claim 15 wherein steps (a) - (e) are performed on a geostationary satellite.

19. A method in accordance with claim 18 including the step of continually orienting that portion of said geostationary satellite wherein said step of collecting and converting solar energy to dc power is performed with respect to the sun.

* * * * *